(12) United States Patent
Ikeda (10) Patent No.: US 11,270,673 B2
(45) Date of Patent: Mar. 8, 2022

(54) IMAGE GENERATION APPARATUS, IMAGE GENERATION METHOD, AND PROGRAM

(71) Applicant: SONY INTERACTIVE ENTERTAINMENT INC., Tokyo (JP)

(72) Inventor: Takakazu Ikeda, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/055,177

(22) PCT Filed: May 28, 2018

(86) PCT No.: PCT/JP2018/020398
§ 371 (c)(1),
(2) Date: Nov. 13, 2020

(87) PCT Pub. No.: WO2019/229816
PCT Pub. Date: Dec. 5, 2019

(65) Prior Publication Data
US 2021/0151009 A1    May 20, 2021

(51) Int. Cl.
G09G 5/377 (2006.01)
A63F 13/26 (2014.01)
G09G 5/38 (2006.01)
G06F 3/01 (2006.01)

(52) U.S. Cl.
CPC ............. G09G 5/377 (2013.01); A63F 13/26 (2014.09); G09G 5/38 (2013.01); G06F 3/013 (2013.01); G09G 2340/12 (2013.01); G09G 2370/12 (2013.01)

(58) Field of Classification Search
CPC ............... G09G 5/377; G09G 2340/12; G09G 2370/12; G06F 3/013; A63F 13/26
See application file for complete search history.

(56) References Cited

U.S. PATENT DOCUMENTS

| | | | |
|---|---|---|---|
| 2017/0076461 A1* | 3/2017 | Zhou | H04N 9/3194 |
| 2017/0372457 A1* | 12/2017 | Sylvan | G06F 3/011 |
| 2018/0137835 A1* | 5/2018 | Jain | G09G 5/14 |

FOREIGN PATENT DOCUMENTS

| | | |
|---|---|---|
| JP | 2012-33038 A | 2/2012 |
| JP | 2012-033038 A | 2/2012 |
| JP | 2013-03339 A | 1/2013 |
| JP | 2013-003339 A | 1/2013 |

(Continued)

OTHER PUBLICATIONS whatis.techtarget.com, "Image Metadata", Mar. 31, 2016, https://web.archive.org/web/20160331150705/https://whatis.techtarget.com/definition/image-metadata. (Year: 2016).*

(Continued)

*Primary Examiner* — Michelle L Sams
(74) *Attorney, Agent, or Firm* — Katten Muchin Rosenman LLP (57) ABSTRACT

A reprojection unit (60) of a head-mounted display (100) receives an original image rendered by a rendering apparatus (200) and applies a reprojection process to the original image. A combining unit (66) combines a superimposed image that is not subject to the reprojection process with an image after the reprojection process by the reprojection unit (60) to generate a combined image. The head-mounted display (100) displays the combined image.

6 Claims, 9 Drawing Sheets

(56) References Cited

FOREIGN PATENT DOCUMENTS

JP      2013003339 A  *  1/2013
JP       6207685 B1    10/2017

OTHER PUBLICATIONS

International Search Report and Written Opinion dated Aug. 21, 2018, from PCT/JP2018/020398, 8 sheets.
International Preliminary Report on Patentability dated Dec. 10, 2020, from PCT/JP2018/020398, 13 sheets.
Office Action dated Jun. 22, 2021 for Japanese Patent Application No. 2020-521665, 2 sheets.

* cited by examiner

IMAGE GENERATION APPARATUS, IMAGE GENERATION METHOD, AND PROGRAM

TECHNICAL FIELD

The invention relates to an image generation technique.

BACKGROUND ART

A head-mounted display connected to a game machine is mounted on the head, and a controller or the like is operated to play a game while a screen displayed on the head-mounted display is viewed. When the head-mounted display is mounted, the user does not view anything other than the video displayed on the head-mounted display. This increases the sense of immersion into the video world and further enhances the entertainment of the game. In addition, a video of virtual reality is displayed on the head-mounted display, and once the user wearing the head-mounted display rotates the head, a 360-degree all-around virtual space is displayed. This further increases the sense of immersion into the video and also improves the operability of the application such as a game.

SUMMARY

Technical Problem

In this way, in a case where the head-mounted display is provided with the head tracking function to generate the video of virtual reality by changing the viewpoint and the gaze direction in conjunction with the motion of the head of the user, there is a deviation between the direction of the head of the user assumed at the time of the generation of the video and the direction of the head of the user at the time of the display of the video on the head-mounted display because there is a delay from the generation to the display of the video of virtual reality. As a result, the user may feel sick (called "VR sickness (Virtual Reality Sickness)" or the like).

Therefore, a reprojection process is generally used, in which a drawn image is corrected to an image according to the orientation at the time of the display of the video based on the difference between orientation data at the time of the generation of the video and orientation data at the time of the display of the video. However, there is inconvenience that a superimposed image, such as a sight mark of FPS (First Person Shooter) or a user interface for messages displayed on the screen, to be displayed at a certain position of the screen regardless of the orientation of the user is also moved due to the reprojection process.

The present invention has been made in view of the problem, and an object of the present invention is to provide an image generation technique in which there is no inconvenience caused by reprojection.

Solution to Problem

To solve the above problem, an aspect of the present invention provides an image generation apparatus including: a reprojection unit applying a reprojection process to an image rendered by another device; and a combining unit combining a superimposed image that is not subject to the reprojection process with the image after the reprojection process by the reprojection unit.

Another aspect of the present invention provides an image generation method. The method includes: a reprojection step of applying a reprojection process to an image rendered by another device; and a combining step of combining a superimposed image that is not subject to the reprojection process with the image after the reprojection process in the reprojection step.

Note that any combination of the constituent elements and a thing obtained by converting the expression of the present invention between a method, an apparatus, a system, a computer program, a data structure, a recording medium, and the like are also effective as modes of the present invention.

Advantageous Effect of Invention

The present invention can provide an image generation technique in which there is no inconvenience caused by reprojection.

DESCRIPTION OF EMBODIMENT

Figure 1:
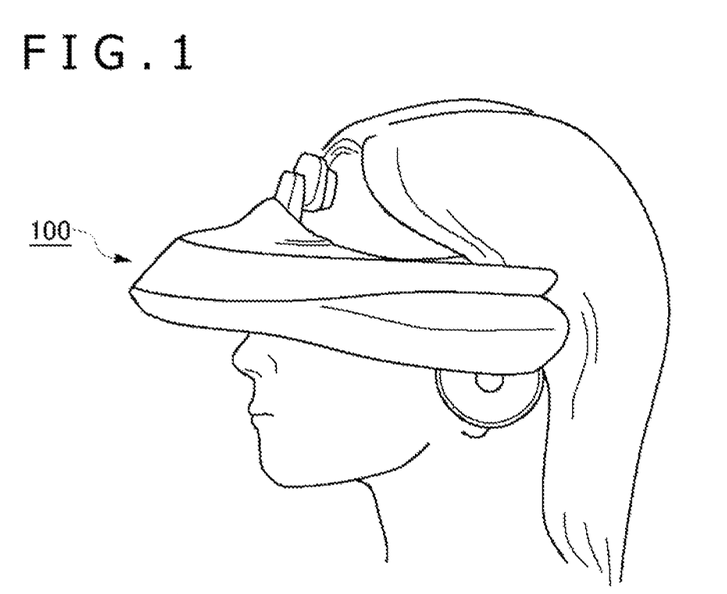
FIG. 1 is an external view of a head-mounted display.

FIG. 1 is an external view of a head-mounted display 100. The head-mounted display 100 is a display apparatus mounted on the head of a user to view still images, moving images, and the like displayed on a display and listen to sound, music, and the like output from a headphone.

A gyro sensor, an acceleration sensor, and the like built in or externally attached to the head-mounted display 100 can be used to measure position information of the head and orientation information, such as a rotation angle and a tilt, of the head of the user wearing the head-mounted display 100.

The head-mounted display 100 may be further provided with a camera that images the eyes of the user. The camera mounted on the head-mounted display 100 can detect the gaze direction of the user, motion of the pupils, blinking, and the like.

The head-mounted display 100 is an example of a "wearable display." Although a generation method of an image displayed on the head-mounted display 100 will be described here, the image generation method of the present embodiment can be applied not only to the head-mounted display 100 in a narrow sense, but also to cases in which glasses, an eyeglass display, an eyeglass camera, a headphone, a headset (headphone with a microphone), an earphone, an earring, an ear-hook camera, a hat, a hat with a camera, a hair band, and the like are worn.

Figure 2:
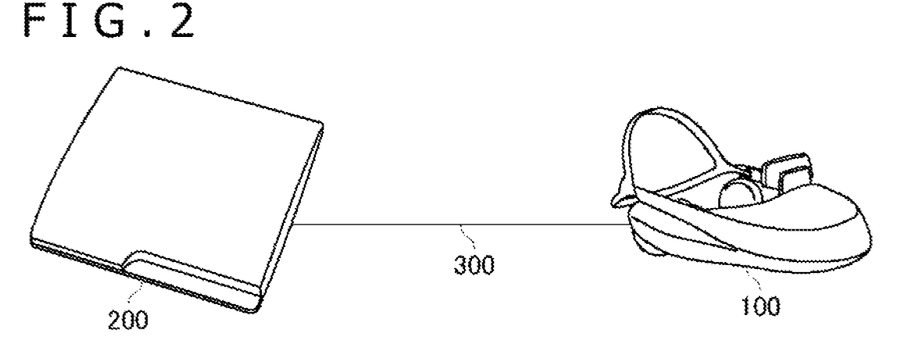
FIG. 2 is a configuration diagram of an image transfer system according to the present embodiment.

FIG. 2 is a configuration diagram of an image transfer system according to the present embodiment. The head-mounted display 100 is connected to a rendering apparatus 200 through an interface of, for example, HDMI (registered trademark) (High-Definition Multimedia Interface) that is a standard of a communication interface using a digital signal to transmit video and sound, DisplayPort that is a standard of a video output interface, or the like.

In the present embodiment, a data transmission path 300 between the head-mounted display 100 and the rendering apparatus 200 is an HDMI transmission path or a DisplayPort transmission path.

In the HDMI standard or the DisplayPort standard, a secondary data packet can be transmitted in association with an image frame, and metadata related to the frame can be included in the secondary data packet.

An HDMI 2.1 standard includes a function called dynamic HDR (High Dynamic Range), and a video can be generated by adjusting each frame to optimal luminance and depth of color according to the scene with reference to dynamic metadata of the video. In the HDMI 2.1 standard, the dynamic metadata can be transmitted after synchronizing information necessary for the dynamic HDR, such as maximum luminance, average luminance, and minimum luminance of the scene, with the video.

The communication interface of the head-mounted display 100 and the rendering apparatus 200 is not limited to the HDMI or the DisplayPort as long as the metadata can be transmitted in synchronization with the video.

An example of the rendering apparatus 200 includes a game machine. The rendering apparatus 200 may be further connected to a server through a network. In that case, the server may provide an online application, such as a game in which a plurality of users can participate through the network, to the rendering apparatus 200. The head-mounted display 100 may be connected to a computer or a mobile terminal instead of the rendering apparatus 200.

The video displayed on the head-mounted display 100 may be a video imaged in advance by a camera or a video using computer graphics such as a game video. In addition, the video may also be a live video of a remote area distributed through a network.

Detection of the orientation of the head-mounted display 100, determination of the next drawing range, issue of a drawing command by a CPU (Central Processing Unit), execution of rendering by a GPU (Graphics Processing Unit), and output of a drawn image on the head-mounted display 100 take time. If the drawing is performed at a frame rate of, for example, 60 fps (frame/second), a delay equivalent to one frame occurs before the output of the image after the detection of the rotation of the head-mounted display 100 even if the CPU is sufficiently fast. This is approximately 16.67 milliseconds at the frame rate of 60 fps, and the time is sufficient for a human to sense the deviation.

Furthermore, there is also latency when the image drawn by the rendering apparatus 200 is transmitted to the head-mounted display 100 through the data transmission path 300.

Therefore, a reprojection process is applied to the generated image so that a human is unlikely to sense the deviation. Although the drawing performed by the rendering apparatus 200 by predicting the position and orientation information of the head-mounted display 100 after delay time is a type of reprojection, a correction process of the image for compensating the deviation between predicted position and orientation information of the head-mounted display 100 assumed by the rendering apparatus 200 in drawing and latest position and orientation information of the head-mounted display 100 in using the head-mounted display 100 to display the image drawn by the rendering apparatus 200 will be referred to as reprojection in the present embodiment.

Specifically, a process is executed to obtain a difference between the predicted position and orientation information of the head-mounted display 100 assumed in drawing and the latest position and orientation information of the head-mounted display 100 and to correct the image according to the latest position and orientation information of the head-mounted display 100, and a technique, such as image conversion and frame interpolation, is used.

In the present embodiment, the rendering apparatus 200 takes into account the delay from the generation to the display of the video to predict the position and orientation information of the head-mounted display 100 to draw an image and transmits, as metadata, information necessary for combining the images to the head-mounted display 100 in synchronization with the frame data of the video. The head-mounted display 100 executes a reprojection process of correcting the image received from the rendering apparatus 200 based on the latest position and orientation information of the head-mounted display 100 and combines a superimposed image with the image after the reprojection process with reference to the metadata.

Due to restrictions on the drawing process performance of the head-mounted display 100, the description in the present embodiment is based on the assumption that the rendering process is executed by the rendering apparatus 200, and the head-mounted display 100 executes mild graphics processing, such as output of a drawn image and a reprojection process. First, problems of the reprojection process to be solved by the image generation technique of the present embodiment will be described.

Figure 3:
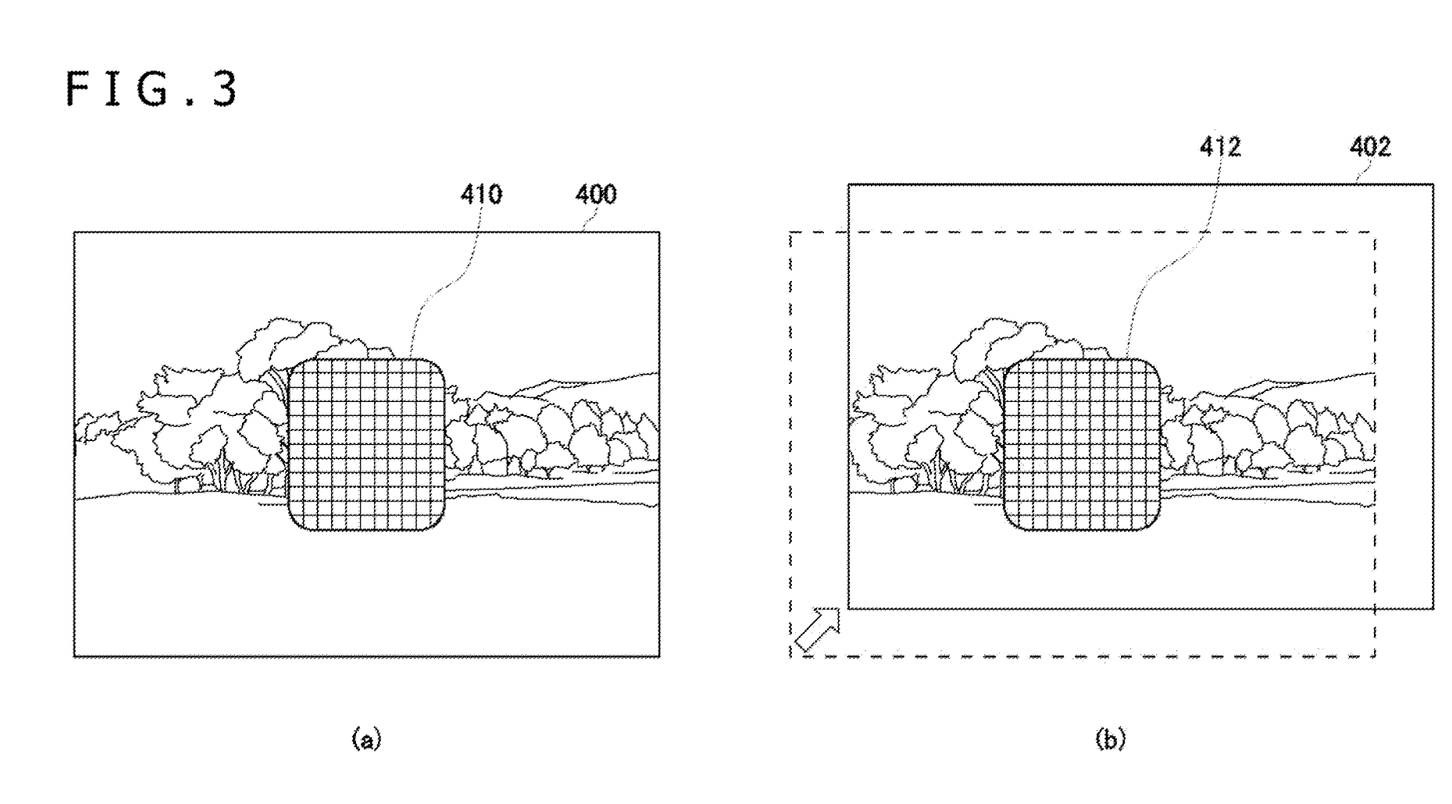
FIG. 3(a) and FIG. 3(b) are diagrams describing a problem of a reprojection process.

FIG. 3(a) and FIG. 3(b) are diagrams describing a problem of the reprojection process.

FIG. 3(a) illustrates a combined image in which a superimposed image 410 is superimposed on a drawn original image 400. The original image 400 is drawn according to the orientation of the user wearing the head-mounted display 100, and the superimposed image 410 is a user interface of a sight mark of FPS, a message, or the like displayed according to the application such as a game. Here, the superimposed image 410 is positioned at the center of the original image 400.

FIG. 3(b) illustrates a result of applying the reprojection process to the combined image of FIG. 3(a) according to the latest orientation of the user. Here, the user has shaken the head to the right, and a correction is made to move the combined image to the lower left. In other words, a display range 402 is moved to the upper right. The entire combined image is moved, and a superimposed image 412 is moved together.

Therefore, the superimposed image 412 is no longer at the center of the display range 402. The superimposed image 412 that should be positioned at the center is deviated to the lower left due to the reprojection process, and the user feels uncomfortable.

Figure 4:
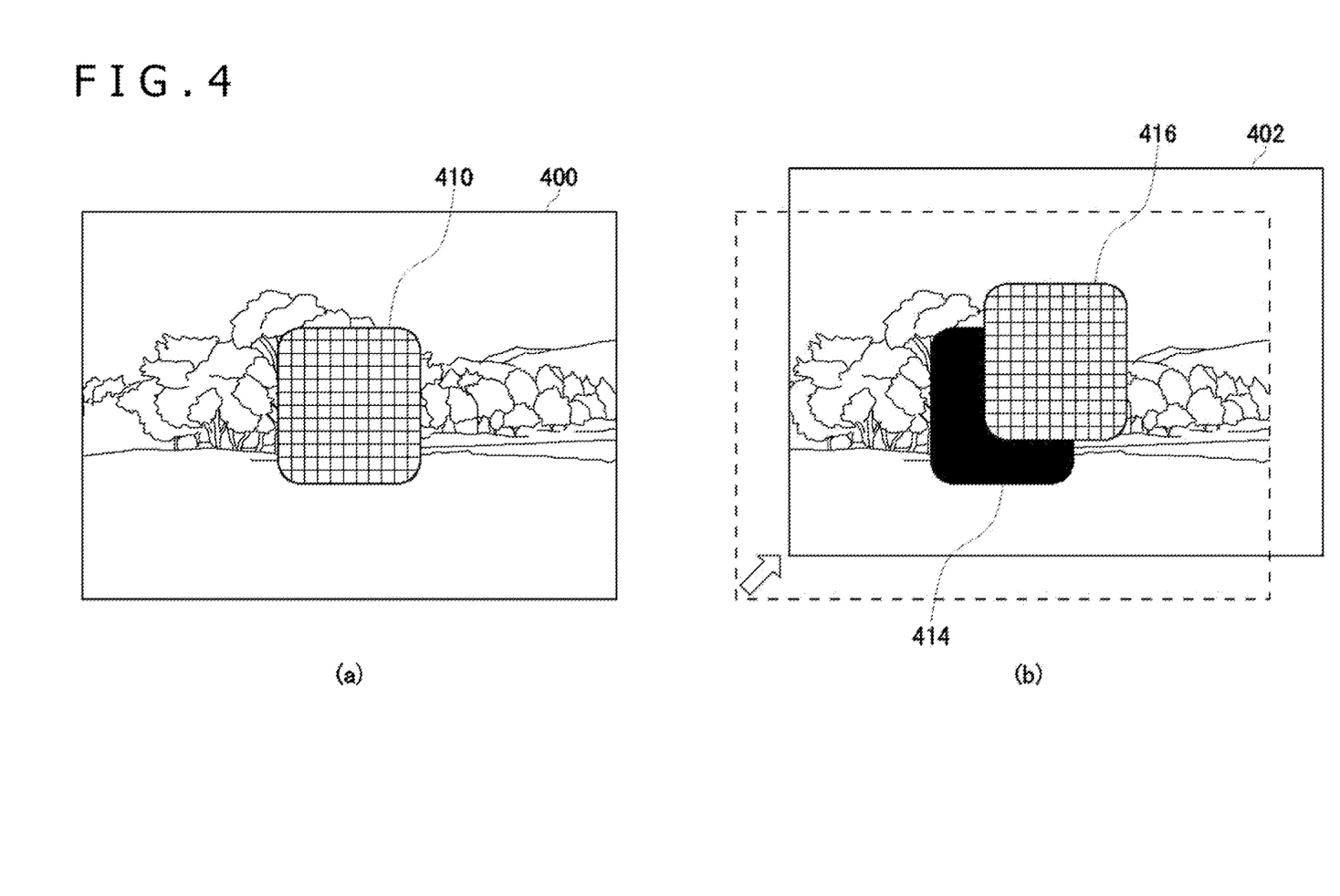
FIG. 4(a) and FIG. 4(b) are diagrams describing another problem of the reprojection process.

FIG. 4(a) and FIG. 4(b) are diagrams describing another problem of the reprojection process.

FIG. 4(a) illustrates a combined image in which the superimposed image 410 is superimposed on the drawn original image 400 as in FIG. 3(a). Here, instead of applying the reprojection process to the entire combined image, the reprojection process is not applied to the region of the superimposed image 410, and the reprojection process is applied to a region other than the region of the superimposed image 410.

FIG. 4(b) illustrates a result of applying the reprojection process to the region other than the region of the superimposed image 410 in the combined image of FIG. 4(a) according to the latest orientation of the user. The region other than the region of the superimposed image 410 moves to the lower left as in FIG. 3(b). The reprojection process is not applied to the region of a superimposed image 416, and the region remains at the position of the center of the display range 402. However, there is no drawing data for the region where the superimposed image 410 exists in the original image 400 of FIG. 4(a), and as a result of the reprojection process, the region becomes a black region 414 as illustrated in FIG. 4(b).

To solve the inconvenience as described in FIG. 3(b) and FIG. 4(b), the reprojection process needs to be applied in advance to the original image 400, and the superimposed image 410 needs to be combined with the image after the reprojection process to generate a combined image.

Figure 5:
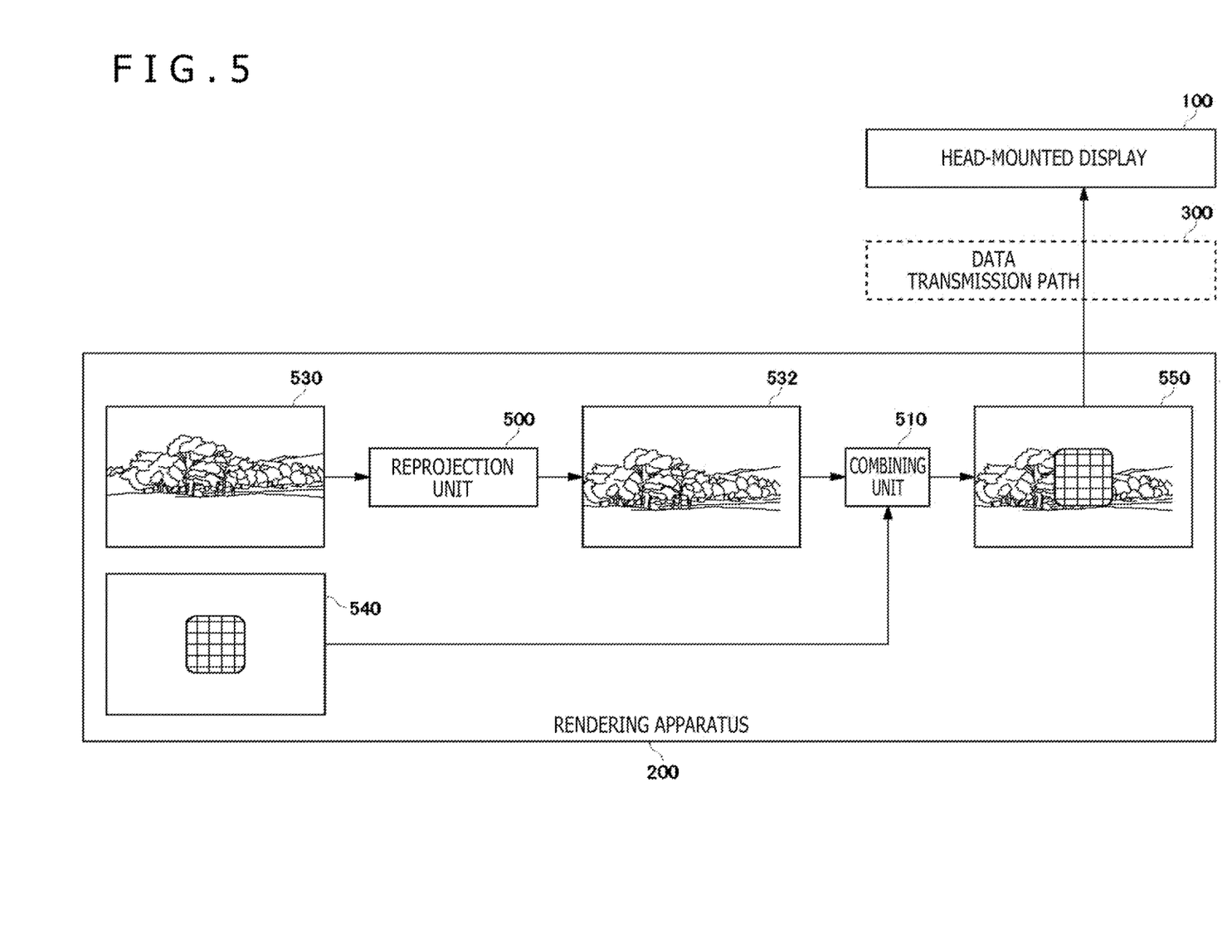
FIG. 5 is a diagram describing a functional configuration of a case in which a rendering apparatus of FIG. 2 executes the reprojection process.

FIG. 5 is a diagram describing a functional configuration of a case in which the rendering apparatus 200 executes the reprojection process.

A reprojection unit 500 and a combining unit 510 are provided on the rendering apparatus 200. The reprojection unit 500 applies a reprojection process to an original image 530 drawn by predicting the orientation of the head-mounted display 100 to generate an image 532 after the reprojection process. The combining unit 510 combines a superimposed image 540 with the image 532 after the reprojection process to generate a combined image 550. The combined image 550 is transmitted to the head-mounted display 100 through the data transmission path 300.

The rendering apparatus 200 combines the superimposed image 540 with the image 532 after the reprojection process. Therefore, the reprojection process is not applied to the superimposed image 540, and there is no inconvenience as described in FIG. 3(b) and FIG. 4(b). This is based on the assumption that the rendering process and the reprojection process are executed by the same device in a closed environment. However, although the rendering apparatus 200 can predict the orientation of the head-mounted display 100 to execute the reprojection process, the real orientation at the time of the display on the head-mounted display 100 cannot be reflected. Therefore, there is a problem that although the image to be displayed can be adjusted to the predicted orientation, the image cannot be adjusted to the latest orientation.

In addition, the reprojection process needs to be executed on the head-mounted display 100 side depending on the processing system. For example, in a case where a process of converting the resolution of the image, the frame rate, and the like according to the characteristics of the display panel of HD (High Definition) or the like is necessary, it is desirable to execute the reprojection process according to the panel characteristics on the head-mounted display 100 side. Furthermore, in a case of transmitting the image to the head-mounted display 100 through a network, the delay time is long, and the delay time varies. Therefore, it is desirable to execute the reprojection process according to the latest orientation on the head-mounted display 100 side.

Thus, a configuration of executing the reprojection process and the combining process on the head-mounted display 100 side will be examined next.

Figure 6:
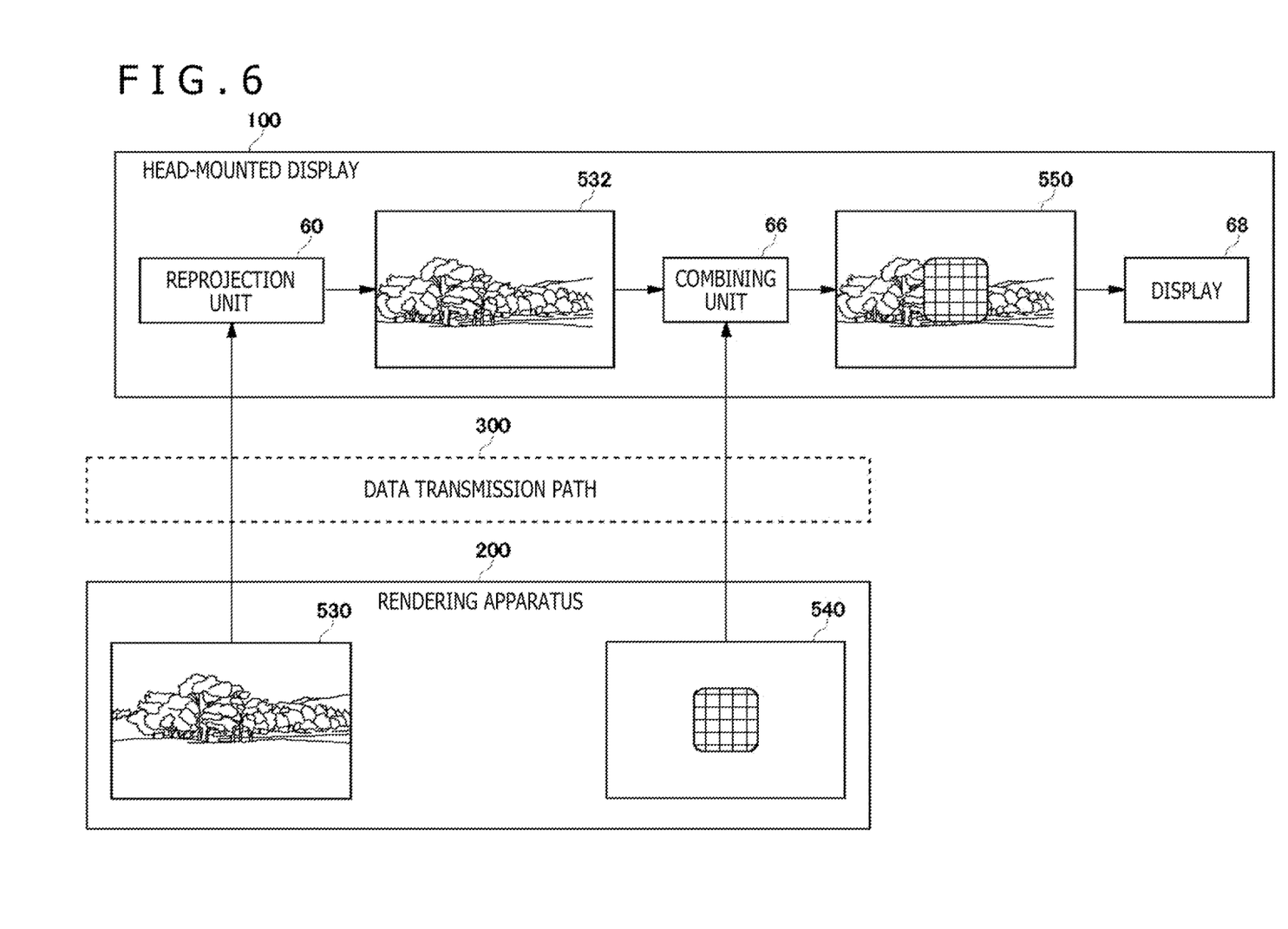
FIG. 6 is a diagram describing a functional configuration of a case in which the head-mounted display of FIG. 2 executes the reprojection process.

FIG. 6 is a diagram describing a functional configuration in the case where the head-mounted display 100 executes the reprojection process.

The rendering apparatus 200 transmits the drawn original image 530 and the superimposed image 540 to the head-mounted display 100 through the data transmission path 300. A reprojection unit 60 and a combining unit 66 are provided on the head-mounted display 100. The reprojection unit 60 applies the reprojection process to the original image 530 received from the rendering apparatus 200 as another device based on the latest orientation of the head-mounted display 100 to generate the image 532 after the reprojection process. The combining unit 66 combines the superimposed image 540 received from the rendering apparatus 200 with the image 532 after the reprojection process to generate the combined image 550. The combined image 550 is displayed on a display 68.

The head-mounted display 100 combines the superimposed image 540 with the image 532 after the reprojection process. Therefore, the superimposed image 540 is not subject to the reprojection process, and there is no inconvenience as described in FIG. 3(b) and FIG. 4(b). In addition, the real orientation can be reflected on the reprojection process of the head-mounted display 100 instead of the predicted orientation, and the image to be displayed can be accurately adjusted to the latest orientation. However, to realize the configuration, the rendering apparatus 200 needs to transmit both of the original image 530 and the superimposed image 540 to the head-mounted display 100 through the data transmission path 300. There is a problem that the two images cannot be transmitted at the same time due to the shortage of transmission band of the data transmission path 300 and the restrictions on the standard of a transmission interface.

Therefore, the original image 530 and the superimposed image 540 are not transmitted at the same time in the present embodiment. The superimposed image 540 is stored in advance on the head-mounted display 100 side, and information necessary for combining the superimposed image 540 is transmitted as metadata in synchronization with the original image 530. In this way, the superimposed image 540 does not have to be transmitted at the same time as the original image 530.

Figure 7:
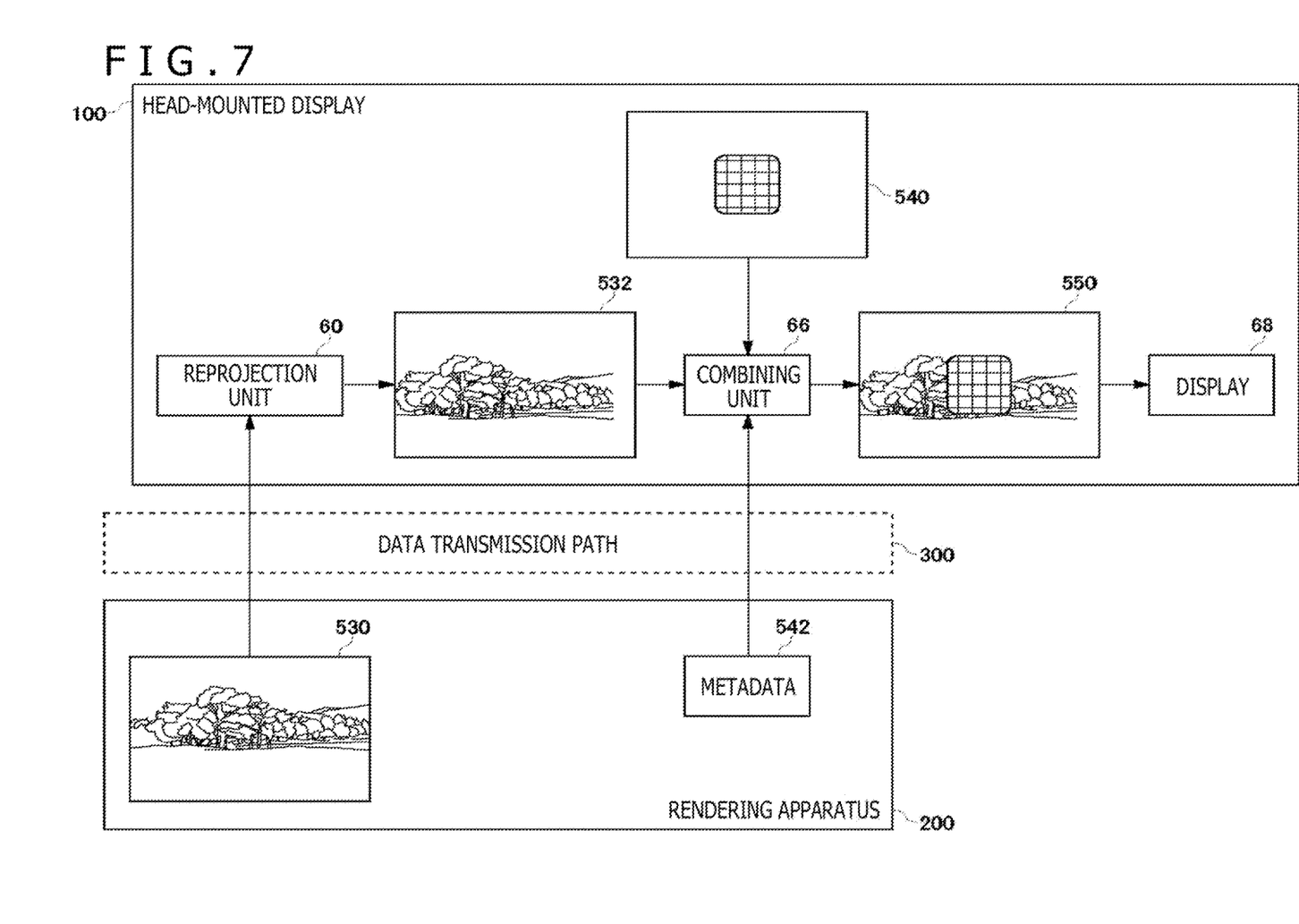
FIG. 7 is a diagram describing a functional configuration of the head-mounted display according to the present embodiment.

FIG. 7 is a diagram describing a functional configuration of the head-mounted display 100 of the present embodiment.

The superimposed image 540 is stored in advance in the head-mounted display 100. The rendering apparatus 200 may generate the superimposed image 540 and transmit the superimposed image 540 to the head-mounted display 100 in advance. Due to the characteristic that the superimposed image 540 is a sight of FPS or a menu screen displayed at a fixed position, the superimposed image 540 is not updated as frequently as the original image 530, and the rendering apparatus 200 can generate the superimposed image 540 in advance and supply the superimposed image 540 to the head-mounted display 100. Alternatively, the head-mounted display 100 may generate the superimposed image 540. The size of the superimposed image 540 may be smaller than the size of the original image 530, and the resolution may also be lower. Therefore, the head-mounted display 100 can generate the superimposed image 540. In any case, the superimposed image 540 is configured to be uniquely specified by an image index between the head-mounted display 100 and the rendering apparatus 200.

The rendering apparatus 200 transmits the drawn original image 530 and the metadata 542 to the head-mounted display 100 through the data transmission path 300. Combining information necessary for combining the superimposed image 540 with the original image 530 is stored in the metadata 542. The combining information includes information indicating whether or not to use the superimposed image, identification information (image index) that can uniquely specify the superimposed image, an alpha value for combining, position information on an image where the superimposed image is to be combined, an image size, a vertical and horizontal scale (magnification) of image, and the like.

A plurality of superimposed images may be prepared. The head-mounted display 100 may generate and store a superimposed image. In that case, the head-mounted display 100 transmits the combining information of the superimposed image to the rendering apparatus 200 to allow the rendering apparatus 200 side to specify the superimposed image and designate the combining information of the superimposed image.

Alternatively, the rendering apparatus 200 may generate the superimposed image and transmit the superimposed image to the head-mounted display 100 in advance at a timing when the drawing data is not transmitted to the head-mounted display 100. For example, in a case where the drawing is performed at 60 Hz, and the frame rate is converted into 120 Hz in the reprojection process, the transmission band of the data transmission path 300 may be 60 Hz because the head-mounted display 100 executes the reprojection process in the present embodiment. There is unoccupied time in which the drawing data is not transmitted, and the superimposed image can be transmitted in the unoccupied time. That is, the frame rate of the superimposed image may be lower than the frame rate of the image rendered by the head-mounted display 100.

The reprojection unit 60 and the combining unit 66 are provided on the head-mounted display 100. The reprojection unit 60 applies the reprojection process to the drawn original image 530 based on the latest orientation of the head-mounted display 100 to generate the image 532 after the reprojection process. The combining unit 66 combines the superimposed image 540 with the image 532 after the reprojection process with reference to the metadata 542 to generate the combined image 550. The combined image 550 is displayed on the display 68.

In the configuration of the present embodiment, the rendering apparatus 200 does not have to transmit both of the original image 530 and the superimposed image 540 at the same time to the head-mounted display 100 through the data transmission path 300, and the rendering apparatus 200 can synchronize the metadata 542 with the original image 530 and transmit the metadata 542 to the head-mounted display 100. A function, such as a secondary packet, in the standard of the transmission interface of the data transmission path 300 can be used to transmit the metadata 542 in synchronization with the original image 530.

Hereinafter, the configuration and the operation of the head-mounted display 100 and the rendering apparatus 200 of the present embodiment will be described in detail.

Figure 8:
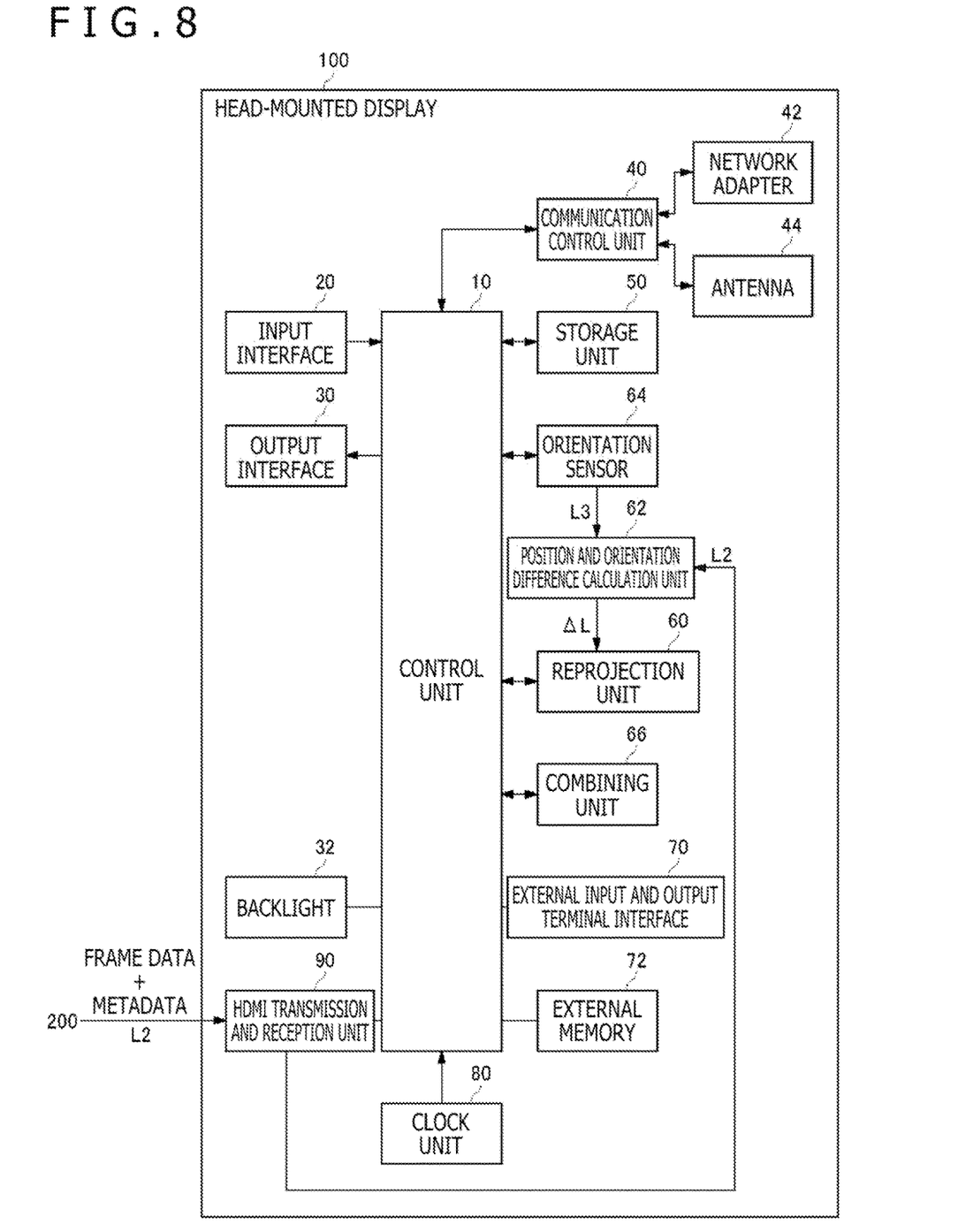
FIG. 8 is a functional configuration diagram of the head-mounted display according to the present embodiment.

FIG. 8 is a functional configuration diagram of the head-mounted display 100.

A control unit 10 is a main processor that processes and outputs a signal, such as an image signal and a sensor signal, a command, or data. An input interface 20 receives an operation signal or a setting signal from the user and supplies the signal to the control unit 10. An output interface 30 receives the image signal from the control unit 10 and causes a display to display the image signal. A backlight 32 supplies backlight to a liquid crystal display.

The communication control unit 40 uses wired or wireless communication to transmit data input from the control unit 10 to the outside through a network adapter 42 or an antenna 44. The communication control unit 40 also uses wired or wireless communication to receive data from the outside through the network adapter 42 or the antenna 44 and outputs the data to the control unit 10.

A storage unit 50 temporarily stores data, parameters, an operation signal, and the like processed by the control unit 10.

An external input and output terminal interface 70 is an interface for connecting a peripheral device such as a USB (Universal Serial Bus) controller. An external memory 72 is an external memory such as a flash memory.

A clock unit 80 uses a setting signal from the control unit 10 to set time information and supplies time data to the control unit 10.

An HDMI transmission and reception unit 90 transmits and receives digital signals of video and sound according to the HDMI. Metadata is associated with frame data received by the HDMI transmission and reception unit 90 from the rendering apparatus 200, and the metadata includes identification information specifying the superimposed image to be combined with the frame data and position information designating the combining position of the superimposed image. The metadata also includes predicted position and orientation information L2 of the head-mounted display 100 assumed by the rendering apparatus 200 in drawing the frame data.

The control unit 10 can supply an image and text data to the output interface 30 to display the image and the text data on the display or can supply the image and the text data to the communication control unit 40 to transmit the image and the text data to the outside.

The orientation sensor 64 detects position information of the head-mounted display 100 and orientation information, such as a rotation angle and a tilt, of the head-mounted display 100. The orientation sensor 64 is realized by appropriately combining a gyro sensor, an acceleration sensor, an angular velocity sensor, and the like. A motion sensor including a combination of at least one of a 3-axis geomagnetic sensor, a 3-axis acceleration sensor, or a 3-axis gyro (angular velocity) sensor may be used to detect front and back, left and right, and up and down motions of the head of the user.

Current position and orientation information L1 of the head-mounted display 100 detected by the orientation sensor 64 is notified to the rendering apparatus 200 through the communication control unit 40 or the external input and output terminal interface 70. Alternatively, the HDMI transmission and reception unit 90 may transmit the current position and orientation information L1 of the head-mounted display 100 to the rendering apparatus 200. The rendering apparatus 200 takes into account the delay from the generation to the display of the video to predict the position and orientation information of the head-mounted display 100 from the received current position and orientation information L1 of the head-mounted display 100 and draws an image to be displayed on the head-mounted display 100 based on the predicted position and orientation information L2 of the head-mounted display 100.

When the orientation sensor 64 receives drawing data from the rendering apparatus 200, the orientation sensor 64 detects latest position and orientation information L3 of the head-mounted display 100 and provides the latest position and orientation information L3 to a position and orientation difference calculation unit 62. The position and orientation difference calculation unit 62 receives, from the HDMI transmission and reception unit 90, the predicted position and orientation information L2 assumed by the rendering apparatus 200 in drawing. The position and orientation difference calculation unit 62 obtains a difference ΔL between the latest position and orientation information L3 and the predicted position and orientation information L2 and provides the difference ΔL to the reprojection unit 60. It should be noted here that although both of the position information and the orientation information of the head-mounted display 100 are generally different in relation to the difference ΔL between the latest position and orientation information L3 and the predicted position and orientation information L2, only one of the position information and the orientation information is different in some cases.

The reprojection unit 60 corrects the drawing data received by the HDMI transmission and reception unit 90 from the rendering apparatus 200 based on the difference ΔL to thereby execute reprojection and provides the drawing data after reprojection to the control unit 10.

The combining unit 66 reads the superimposed image designated by the metadata from the storage unit 50 and combines the superimposed image with the drawing data after reprojection to generate a combined image. The control unit 10 supplies the combined image to the output interface 30 to cause the display to display the combined image.

Figure 9:
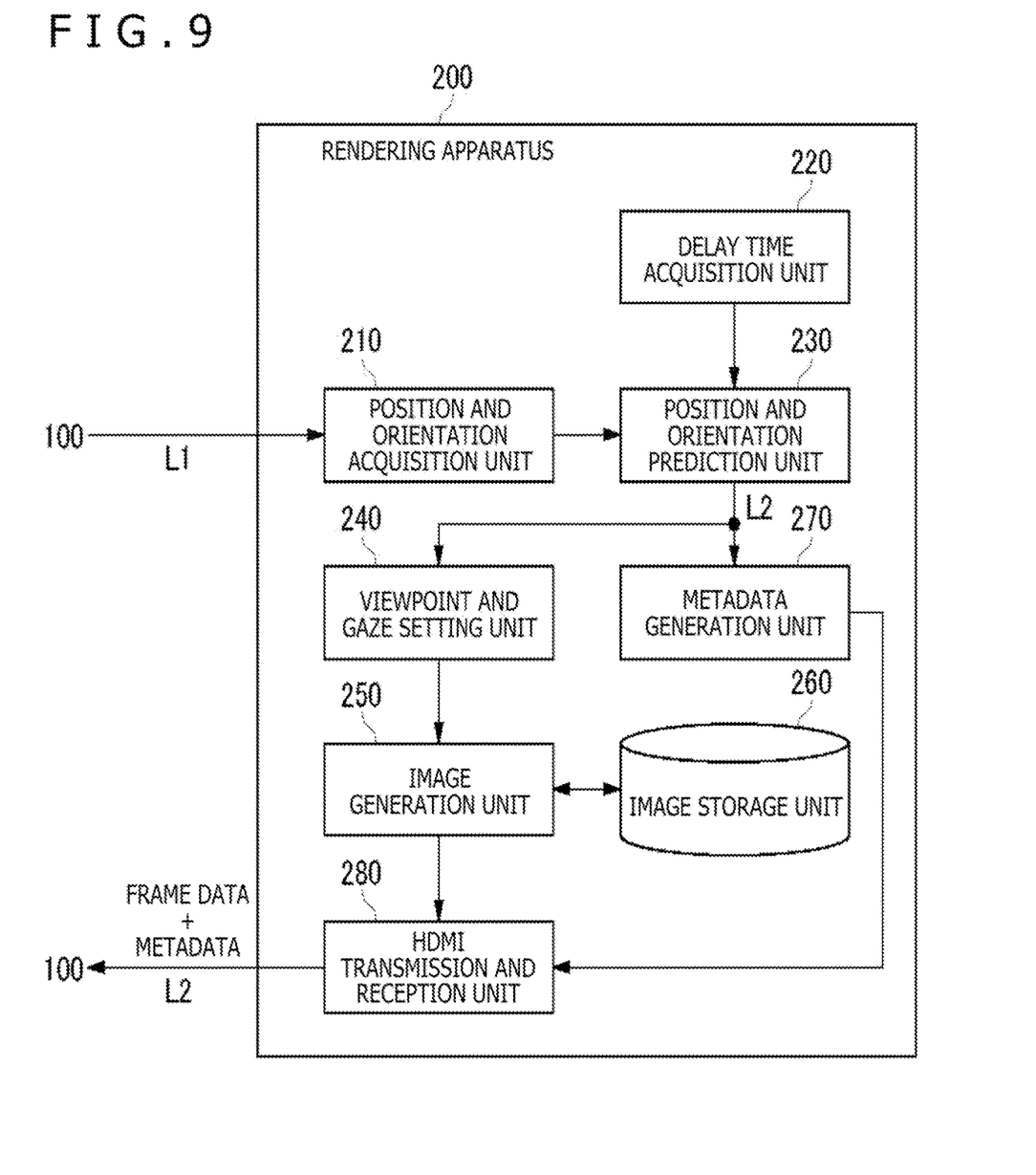
FIG. 9 is a functional configuration diagram of the rendering apparatus according to the present embodiment.

FIG. 9 is a functional configuration diagram of the rendering apparatus 200 according to the present embodiment. FIG. 9 depicts a block diagram focusing on functions. The functional blocks can be realized in various forms, such as only by hardware, only by software, and by a combination of the hardware and the software.

At least part of the functions of the rendering apparatus 200 may be implemented in the head-mounted display 100. Alternatively, at least part of the functions of the rendering apparatus 200 may be implemented in a server connected to the rendering apparatus 200 through a network.

A position and orientation acquisition unit 210 acquires the current position and orientation information L1 of the head-mounted display 100 from the head-mounted display 100.

A delay time acquisition unit 220 acquires required delay time from the drawing of an image, which is viewed in the gaze direction from the viewpoint position at certain time, to the display of the image on the head-mounted display 100. The delay time includes time required for the drawing process as well as time required for transmitting the image data. The delay time acquisition unit 220 obtains the delay time based on the three-dimensional drawing hardware performance and the transmission delay of the transmission path.

A position and orientation prediction unit 230 predicts amounts of change in the position and the orientation during the delay time obtained by the delay time acquisition unit 220. The position and orientation prediction unit 230 can multiply the translation speed and the angular velocity of the head of the user wearing the head-mounted display 100 by the delay time to obtain the amounts of change in the position and the orientation. The position and orientation prediction unit 230 adds the amounts of change in the position and the orientation during the delay time to the current position and orientation information L1 to predict the predicted position and orientation information L2 after delay time and supplies the predicted position and orientation information L2 to a viewpoint and gaze setting unit 240 and a metadata generation unit 270.

The viewpoint and gaze setting unit 240 uses the predicted position and orientation information L2 of the head-mounted display 100 acquired by the position and orientation prediction unit 230 to update the viewpoint position and the gaze direction of the user.

An image generation unit 250 reads image data from an image storage unit 260 and generates an image viewed in the gaze direction from the viewpoint position of the user wearing the head-mounted display 100 according to the viewpoint position and the gaze direction of the user set by the viewpoint and gaze setting unit 240. The image generation unit 250 provides the image to an HDMI transmission and reception unit 280. Here, the image data may be moving image or still image content created in advance or may be rendered computer graphics.

The metadata generation unit 270 embeds combining information, which is necessary for combining the superimposed image with the frame data, into metadata to be associated with the frame data. In addition, the metadata generation unit 270 acquires the predicted position and orientation information L2 from the position and orientation prediction unit 230 and embeds the predicted position and orientation information L2 into the metadata to be associated with the frame data. The metadata generation unit 270 supplies the metadata to the HDMI transmission and reception unit 280.

The HDMI transmission and reception unit 280 receives the frame data from the image generation unit 250 and receives, from the metadata generation unit 270, the metadata in which the combining information of the superimposed image and the predicted position and orientation information L2 are embedded. The HDMI transmission and reception unit 280 synchronizes the metadata with the frame data according to the HDMI and transmits the frame data and the metadata to the head-mounted display 100.

A method of synchronizing the metadata with the frame data and transmitting the metadata and the frame data through the same transmission path will be described. The frame data and the dynamic metadata are transmitted through, for example, an HDMI transmission path. A vertical blanking signal VBlank is inserted just before each piece of frame data, and the metadata is inserted into the vertical blanking signal VBlank.

In this way, by inserting each piece of metadata to be applied to each piece of frame data into the vertical blanking signal VBlank of each piece of frame data and transmitting the frame data and the metadata through the same HDMI transmission path, each piece of metadata is synchronized with each piece of frame data. Therefore, the head-mounted display 100 can correctly apply each piece of the metadata to each corresponding piece of the frame data.

In the HDMI 2.1 standard, it is examined to transmit the frame data and the metadata after inserting the metadata to be applied to each frame into the VBlank signal of each piece of frame data. Although the metadata is inserted into the VBlank signal of the HDMI 2.1 standard in the example described here, this is just an example, and the metadata can be inserted into any synchronization signal synchronized with each frame before transmitting the frame data and the metadata.

Figure 10:
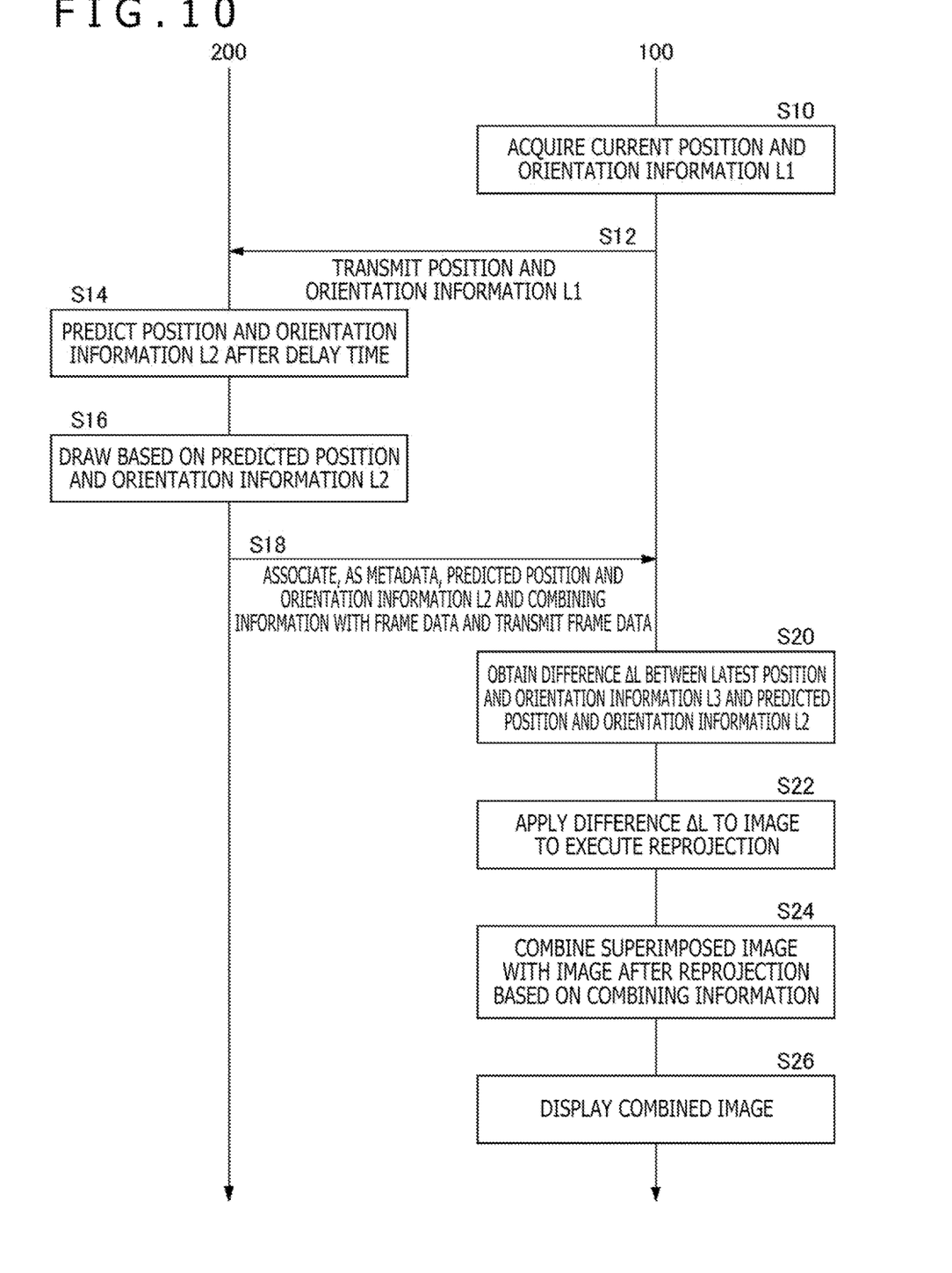
FIG. 10 is a sequence diagram describing an image generation procedure according to the present embodiment.

FIG. 10 is a sequence diagram describing an image generation procedure according to the present embodiment.

The orientation sensor 64 of the head-mounted display 100 detects the current position and orientation information L1 of the head-mounted display 100 (S10). The head-mounted display 100 notifies the rendering apparatus 200 of the current position and orientation information L1 (S12).

The rendering apparatus 200 obtains the delay time generated due to the transmission delay between the head-mounted display 100 and the rendering apparatus 200 and the processing delay in the drawing by the rendering apparatus 200. The position and orientation prediction unit 230 of the rendering apparatus 200 predicts the predicted position and orientation information L2 of the head-mounted display 100 after delay time from the current position and orientation information L1 (S14).

The image generation unit 250 of the rendering apparatus 200 draws the image that can be viewed by the user wearing the head-mounted display 100 based on the predicted position and orientation information L2 (S16).

The HDMI transmission and reception unit 280 of the rendering apparatus 200 associates, as metadata, the predicted position and orientation information L2 and the combining information necessary for combining the superimposed image with the drawn frame data and transmits the frame data to the head-mounted display 100 (S18).

Once the frame data is received from the rendering apparatus 200, the orientation sensor 64 of the head-mounted display 100 detects the latest position and orientation information L3 of the head-mounted display 100, and the position and orientation difference calculation unit 62 obtains the difference ΔL between the latest position and orientation information L3 and the predicted position and orientation information L2 (S20).

The reprojection unit 60 applies the reprojection process to the frame data based on the difference ΔL to generate the image according to the latest position and orientation information L3 (S22).

The combining unit 66 refers to the combining information included in the metadata and specifies the superimposed image based on the identification information included in the combining information to combine the superimposed image at the designated scale and at the designated position of the image after the reprojection, based on the position information and the scale included in the combining information (S24). The head-mounted display 100 displays the combined image (S26).

As described above, the rendering apparatus 200 of the present embodiment can render the image and transmit, as metadata, the combining information necessary for combining the superimposed image to the head-mounted display 100 in synchronization with the frame data of the image. The head-mounted display 100 can extract the combining information from the metadata and apply the reprojection to the frame data of the image. The head-mounted display 100 can then combine the prepared superimposed image with the image after the reprojection according to the parameters designated in the combining information. This can prevent the superimposed image to be displayed at the fixed position from being affected by the reprojection process. In addition, the superimposed image does not have to be transmitted at the same time as the drawing frame, and the process can be executed even in the situation with restrictions on the transmission band of the data transmission path 300.

The present invention has been described based on the embodiment. The embodiment is illustrative, and those skilled in the art will understand that various modifications can be made to the combination of the constituent elements and the processing processes of the embodiment and that the modifications are also within the scope of the present invention. The modifications will be described.

In the case described above, the head-mounted display 100 applies the reprojection process to the original image drawn by the rendering apparatus 200 and combines the superimposed image with the original image. The image generation technique of the present embodiment can be applied as long as the device that renders the original image and the device that applies the reprojection process to the original image are different. Therefore, the device that executes the reprojection process and the combining process is not limited to the head-mounted display 100, and for example, the device may be a mobile terminal or the like.

REFERENCE SIGNS LIST

10 Control unit, 20 Input interface, 30 Output interface, 32 Backlight, 40 Communication control unit, 42 Network adapter, 44 Antenna, 50 Storage unit, 60 Reprojection unit, 62 Position and orientation difference calculation unit, 64 Orientation sensor, 66 Combining unit, 70 External input and output terminal interface, 72 External memory, 80 Clock unit, 90 HDMI transmission and reception unit, 100 Head-mounted display, 200 Rendering apparatus, 210 Position and orientation acquisition unit, 220 Delay time acquisition unit, 230 Position and orientation prediction unit, 240 Viewpoint and gaze setting unit, 250 Image generation unit, 260 Image storage unit, 270 Metadata generation unit, 280 HDMI transmission and reception unit, 300 Data transmission path.

INDUSTRIAL APPLICABILITY

The invention can be used for an image generation technique.

The invention claimed is:

1. An image generation apparatus comprising:
a reprojection unit applying a reprojection process to an image rendered and received from another device; and
a combining unit combining a superimposed image, from a plurality of superimposed images, that is not subject to the reprojection process and that is to be displayed at a certain position of a screen regardless of orientation of a user with the image after the reprojection process by the reprojection unit,
wherein the plurality of superimposed images are stored on the image generation apparatus prior to receiving the image, and
wherein metadata transmitted with the image is used to select the superimposed image from the plurality of superimposed images and to select the certain position for the superimposed image.

2. The image generation apparatus according to claim 1, wherein
the superimposed image that is not subject to the reprojection process is provided with identification information capable of being uniquely specified between the another device and the image generation apparatus, and the identification information is included in the metadata.

3. The image generation apparatus according to claim 1, wherein
the metadata is inserted into a synchronization signal transmitted in synchronization with frame data of the image rendered by the another device.

4. The image generation apparatus according to claim 1, wherein
a frame rate of the superimposed image that is not subject to the reprojection process is lower than a frame rate of the image rendered by the other device.

5. An image generation method comprising:
  applying a reprojection process to an image rendered and received from by another device; and
  combining a superimposed image, from a plurality of superimposed images, that is not subject to the reprojection process and that is to be displayed at a certain position of a screen regardless of orientation of a user with the image after the reprojection process,
  wherein the plurality of superimposed images are stored on the image generation apparatus prior to receiving the image, and
  wherein metadata transmitted with the image is used to select the superimposed image from the plurality of superimposed images and to select the certain position for the superimposed image.

6. A non-transitory computer readable medium having stored thereon a program for a computer, comprising:
  by a reprojection unit, applying a reprojection process to an image rendered by another device; and
  by a combining unit, combining a superimposed image, from a plurality of superimposed images, that is not subject to the reprojection process and that is to be displayed at a certain position of a screen regardless of orientation of a user with the image after the reprojection process,
  wherein the plurality of superimposed images are stored on the image generation apparatus prior to receiving the image, and
  wherein metadata transmitted with the image is used to select the superimposed image from the plurality of superimposed images and to select the certain position for the superimposed image.

\* \* \* \* \*